(12) United States Patent
Kobayashi et al.

(10) Patent No.: US 11,366,258 B2
(45) Date of Patent: *Jun. 21, 2022

(54) WIDE-BAND WAVELENGTH FILM, METHOD FOR PRODUCING SAME, AND METHOD FOR PRODUCING CIRCULAR POLARIZATION FILM

(71) Applicant: ZEON CORPORATION, Tokyo (JP)

(72) Inventors: Takao Kobayashi, Tokyo (JP); Shunsuke Takagi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 16/340,688

(22) PCT Filed: Oct. 27, 2017

(86) PCT No.: PCT/JP2017/038998
§ 371 (c)(1),
(2) Date: Apr. 10, 2019

(87) PCT Pub. No.: WO2018/079745
PCT Pub. Date: May 3, 2018

(65) Prior Publication Data
US 2019/0293852 A1    Sep. 26, 2019

(30) Foreign Application Priority Data

Oct. 31, 2016  (JP) .............................. JP2016-213324
Oct. 23, 2017  (JP) .............................. JP2017-204740

(51) Int. Cl.
*G02B 5/30*  (2006.01)
*B32B 7/023*  (2019.01)
(Continued)

(52) U.S. Cl.
CPC ............ *G02B 5/3083* (2013.01); *B29C 55/04* (2013.01); *B29D 11/00644* (2013.01);
(Continued)

(58) Field of Classification Search
CPC ........ G02B 5/3083; G02B 5/30; B32B 7/023; B32B 7/02; B32B 27/08; B32B 2307/42;
(Continued)

(56) References Cited

U.S. PATENT DOCUMENTS 10,295,714  B2 *  5/2019  Oosato ................... H05B 33/02
2009/0290103  A1    11/2009  Itou
(Continued)

FOREIGN PATENT DOCUMENTS

JP    3701022 B2    9/2005
JP    1565507 B2    10/2010
(Continued)

OTHER PUBLICATIONS

Jan. 30, 2018, International Search Report issued in the International Patent Application No. PCT/JP2017/038998.
(Continued)

*Primary Examiner* — Stephone B Allen
*Assistant Examiner* — Adam W Booher
(74) *Attorney, Agent, or Firm* — Kenja IP Law PC (57) ABSTRACT

A method for producing a broadband wavelength film including, in this order: a first step of preparing a layer (A) as a long-length obliquely stretched film; a second step of forming on the layer (A) a layer (B) of a resin having a negative intrinsic birefringence to obtain a multilayer film; and a third step of stretching the multilayer film to obtain a long-length broadband wavelength film including a λ/2 layer and a λ/4 layer.

11 Claims, 2 Drawing Sheets

(51) Int. Cl.
 *B29D 11/00* (2006.01)
 *B32B 27/08* (2006.01)
 *B32B 7/02* (2019.01)
 *B29C 55/04* (2006.01)

(52) U.S. Cl.
 CPC ............... *B32B 7/02* (2013.01); *B32B 7/023* (2019.01); *B32B 27/08* (2013.01); *G02B 5/30* (2013.01); *B32B 2307/42* (2013.01)

(58) Field of Classification Search
 CPC .. B29C 55/04; B29C 55/045; B29D 11/00644
 See application file for complete search history.

(56) References Cited

U.S. PATENT DOCUMENTS

| | | | | |
|---|---|---|---|---|
| 2010/0272971 | A1* | 10/2010 | Miyai | C08L 23/18 428/212 |
| 2011/0052837 | A1* | 3/2011 | Hashimoto | B32B 27/325 428/1.3 |
| 2014/0168768 | A1* | 6/2014 | Seo | G02B 5/3083 359/489.07 |
| 2014/0332786 | A1* | 11/2014 | Nakazawa | H01L 51/5275 257/40 |
| 2015/0002010 | A1* | 1/2015 | Lee | G02B 5/3025 313/112 |
| 2017/0052300 | A1 | 2/2017 | Takeda et al. | |
| 2017/0081567 | A1* | 3/2017 | Ha | C08F 220/1808 |
| 2017/0276850 | A1 | 9/2017 | Oosato | |
| 2018/0093404 | A1 | 4/2018 | Hatano et al. | |
| 2019/0155082 | A1* | 5/2019 | Sakai | G02F 1/133634 |
| 2019/0243049 | A1* | 8/2019 | Kobayashi | B29C 55/14 |

FOREIGN PATENT DOCUMENTS

| | | |
|---|---|---|
| JP | 5120379 B2 | 1/2013 |
| JP | 5186926 B2 | 4/2013 |
| JP | 2015210459 A | 11/2015 |
| TW | 201614287 A | 4/2016 |
| WO | 2009031433 A1 | 3/2009 |
| WO | 2016047465 A1 | 3/2016 |
| WO | 2016140077 A1 | 9/2016 |

OTHER PUBLICATIONS

Apr. 30, 2019, International Preliminary Report on Patentability issued in the International Patent Application No. PCT/JP2017/038998.

* cited by examiner

WIDE-BAND WAVELENGTH FILM, METHOD FOR PRODUCING SAME, AND METHOD FOR PRODUCING CIRCULAR POLARIZATION FILM

FIELD

The present invention relates to a broadband wavelength film and a method for producing the broadband wavelength film, as well as a method for producing a circular polarization film.

BACKGROUND

There have hitherto been conducted a variety of studies on methods for producing an optical film including two or more layers (Patent Literatures 1 to 6).

CITATION LIST

Patent Literature

Patent Literature 1: International Publication No. 2016/047465
Patent Literature 2: Japanese Patent Application Laid-Open No. 2015-210459 A
Patent Literature 3: Japanese Patent No. 5120379 B
Patent Literature 4: Japanese Patent No. 5186926 B
Patent Literature 5: Japanese Patent No. 4565507 B
Patent Literature 6: Japanese Patent No. 3701022 B

SUMMARY

Technical Problem

As a broadband wavelength film which can function as a wavelength plate in a broad wavelength band, there is known a film including a combination of a $\lambda/2$ plate and a $\lambda/4$ plate. Such a broadband wavelength film has been generally produced by a production method which includes: a step of stretching a certain film to obtain a $\lambda/2$ plate; a step of stretching another film to obtain a $\lambda/4$ plate; and a step of bonding the $\lambda/2$ plate and the $\lambda/4$ plate to obtain a broadband wavelength film.

Also, there is known a technology of combining the aforementioned broadband wavelength film with a linear polarization film as a film capable of functioning as a linear polarization plate to obtain a circular polarization film. In general, a long-length linear polarization film has an absorption axis in its lengthwise direction or in its width direction. Therefore, when the broadband wavelength film is combined with a long-length linear polarization film to obtain a circular polarization film, the slow axis of the $\lambda/2$ plate is required not to be in a parallel or perpendicular direction but to be in an oblique direction relative to its width direction.

For easily producing a desired $\lambda/2$ plate which has a slow axis in an oblique direction as previously described, the applicant developed a technology of performing stretching twice or more as described in Patent Literature 1. According to such a technology, the number of stretching operations comes to be three or more in total throughout the method for producing the broadband wavelength film, including one or more stretching operations for obtaining the $\lambda/4$ plate and two or more stretching operations for obtaining the $\lambda/2$ plate. However, the operation with a large number of stretching operations as much as three or more was complicated.

The present invention has been devised in view of the aforementioned problem. An object of the present invention is to provide: a broadband wavelength film which can be efficiently produced with a small number of steps and a method for producing the broadband wavelength film; and a method for producing a circular polarization film including the method for producing the broadband wavelength film.

Solution to Problem

The present inventor has intensively conducted research for solving the aforementioned problem. As a result, the present inventor has found that the aforementioned problem can be solved by a production method which includes, in this order: a first step of preparing a layer (A) as a long-length obliquely stretched film; a second step of forming on the layer (A) a layer (B) of a resin having a negative intrinsic birefringence to obtain a multilayer film; and a third step of stretching this multilayer film to obtain a broadband wavelength film. Thus, the present invention has been accomplished.

That is, the present invention includes the following:

<1> A method for producing a broadband wavelength film comprising, in this order:
  a first step of preparing a layer (A) as a long-length obliquely stretched film;
  a second step of forming on the layer (A) a layer (B) of a resin having a negative intrinsic birefringence to obtain a multilayer film; and
  a third step of stretching the multilayer film to obtain a long-length broadband wavelength film including a $\lambda/2$ layer and a $\lambda/4$ layer.

<2> The method for producing a broadband wavelength film according to <1>, wherein the $\lambda/2$ layer has a slow axis that forms an angle of $67.5°\pm10°$ with respect to a width direction of the broadband wavelength film.

<3> The method for producing a broadband wavelength film according to <1> or <2>, wherein the $\lambda/4$ layer has a slow axis that forms an angle of $0°\pm20°$ with respect to a width direction of the broadband wavelength film.

<4> The method for producing a broadband wavelength film according to any one of <1> to <3>, wherein the layer (A) has a slow axis that forms an angle of greater than 15° and smaller than 50° with respect to a width direction of the layer (A).

<5> The method for producing a broadband wavelength film according to any one of <1> to <4>, wherein the second step includes coating the layer (A) with a composition containing the resin having a negative intrinsic birefringence.

<6> The method for producing a broadband wavelength film according to any one of <1> to <4>, wherein the second step includes extruding on the layer (A) the resin having a negative intrinsic birefringence.

<7> The method for producing a broadband wavelength film according to any one of <1> to <4>, wherein the second step includes bonding to the layer (A) a film of the resin having a negative intrinsic birefringence.

<8> The method for producing a broadband wavelength film according to any one of <1> to <7>, wherein the third step includes stretching the multilayer film in a stretching direction that forms an angle of $90°\pm20°$ with respect to a width direction of the multilayer film.

<9> The method for producing a broadband wavelength film according to any one of <1> to <8>, wherein the $\lambda/2$ layer is a layer obtained by stretching the layer (A).

<10> The method for producing a broadband wavelength film according to any one of <1> to <9>, wherein the λ/4 layer is a layer obtained by stretching the layer (B).

<11> A method for producing a circular polarization film comprising:
a step of producing a broadband wavelength film by the production method according to any one of <1> to <10>; and
a step of bonding the broadband wavelength film and a long-length linear polarization film.

<12> The method for producing a circular polarization film according to <11>, wherein the linear polarization film has an absorption axis in a lengthwise direction of the linear polarization film.

<13> A long-length broadband wavelength film being a co-stretched film comprising:
a λ/2 layer having a slow axis that forms an angle of 67.5°±10° with respect to a width direction thereof; and
a λ/4 layer having a slow axis that forms an angle of 0°±20° with respect to the width direction.

<14> The long-length broadband wavelength film according to <13>, wherein the λ/2 layer and the λ/4 layer are in direct contact with each other.

<15> The long-length broadband wavelength film according to <13>, comprising a thin film layer between the λ/2 layer and the λ/4 layer, the thin film layer having a thickness of less than 2 μm.

<16> The long-length broadband wavelength film according to any one of <13> to <15>, wherein an Nz factor of the λ/2 layer is 1.0 or more.

<17> The long-length broadband wavelength film according to any one of <13> to <16>, wherein the λ/2 layer is formed of a resin having a positive intrinsic birefringence.

<18> The long-length broadband wavelength film according to <17>, wherein the resin having a positive intrinsic birefringence contains a cyclic olefin polymer.

<19> The long-length broadband wavelength film according to any one of <13> to <18>, wherein an Nz factor of the λ/4 layer is −0.2±0.2.

<20> The long-length broadband wavelength film according to any one of <13> to <19>, wherein the λ/4 layer is formed of a resin having a negative intrinsic birefringence.

<21> The long-length broadband wavelength film according to <20>, wherein the resin having a negative intrinsic birefringence contains a polystyrene-based polymer or a cellulose compound.

<22> The long-length broadband wavelength film according to any one of <13> to <21>, wherein a thickness of the λ/4 layer is 15 μm or less.

<23> The long-length broadband wavelength film according to any one of <13> to <22>, wherein the λ/4 layer contains a plasticizer.

<24> The long-length broadband wavelength film according to <23>, wherein an amount of the plasticizer in the λ/4 layer is 0.001% by weight or more and 20% by weight or less.

Advantageous Effects of Invention

According to the method for producing the broadband wavelength film of the present invention, the number of stretching operations can be reduced compared to the prior art techniques. Therefore, the production of the broadband wavelength film can be efficiently performed with a small number of steps.

The broadband wavelength film according to the present invention can be efficiently produced with the number of steps which is smaller than in the prior art method.

According to the method for producing a circular polarization film of the present invention, the circular polarization film can also be efficiently produced, because the broadband wavelength film can be efficiently produced with a small number of steps.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "long-length" film refers to a film with the length that is 5 times or more the width, and preferably a film with the length that is 10 times or more the width, and specifically refers to a film having a length that allows a film to be wound up into a rolled shape for storage or transportation. The upper limit of the length of the film is not particularly limited, and may be 100,000 times or less the width thereof, for example.

In the following description, an in-plane retardation Re of a layer is a value represented by $Re=(nx-ny) \times d$ unless otherwise specified. A thickness direction retardation Rth of a layer is a value represented by $Rth=\{(nx+ny)/2-nz\} \times d$ unless otherwise specified. Furthermore, an NZ factor of a layer is a value represented by $(nx-nz)/(nx-ny)$ unless otherwise specified. Herein, nx represents a refractive index in a direction in which the maximum refractive index is given among directions perpendicular to the thickness direction of the layer (in-plane directions), ny represents a refractive index in a direction, among the above-mentioned in-plane directions of the layer, orthogonal to the direction giving nx, nz represents a refractive index in the thickness direction of the layer, and d represents the thickness of the layer. The measurement wavelength is 590 nm unless otherwise specified.

In the following description, a material having a positive intrinsic birefringence means a material whose refractive index in the stretching direction is larger than the refractive index in a direction orthogonal thereto unless otherwise specified. A material having a negative intrinsic birefringence means a material whose refractive index in the stretching direction is smaller than the refractive index in the direction orthogonal thereto unless otherwise specified. The value of the intrinsic birefringence may be calculated from the permittivity distribution.

In the following description, "(meth) acrylic" includes "acrylic", "methacrylic" and a combination thereof.

In the following description, an oblique direction of a long-length film refers to a direction which is in the in-plane direction of the film and is neither parallel nor perpendicular to the width direction of the film unless otherwise noted.

In the following description, a front direction of a certain film means the normal direction of the principal surface of the film, specifically, in the direction at the polar angle 0° and the azimuth angle 0° of the principal surface, unless otherwise specified.

In the following description, a tilt direction of a certain film means a direction which is neither parallel nor perpendicular to the principal surface of the film, specifically, in the direction in a polar angle range of larger than 0° and smaller than 90° of the principal surface, unless otherwise specified.

In the following description, a direction of an element being "parallel", "perpendicular", and "orthogonal" may allow an error within the range of not impairing the advantageous effects of the present invention, for example, within a range of ±5°, unless otherwise specified.

In the following description, an angle formed by an optical axis (absorption axis, slow axis, etc.) of each layer in a member including a plurality of layers represents an angle when the layer is viewed from the thickness direction unless otherwise specified.

In the following description, a slow axis of a film or a layer represents a slow axis in a plane of the film or the layer unless otherwise specified.

In the following description, an orientation angle of a film or a layer represents an angle formed by a slow axis of the film or the layer with respect to the width direction of the film or the layer unless otherwise specified.

[1. Outline]

Figure 1:
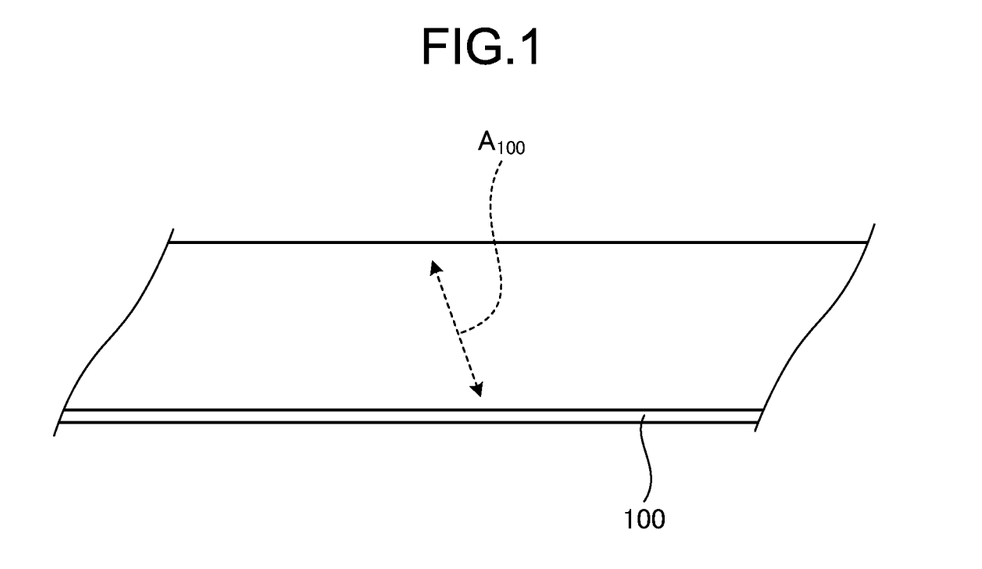
FIG. 1 is a perspective view schematically showing a layer (A) as a long-length obliquely stretched film prepared in a first step of the method for producing a broadband wavelength film according to an embodiment of the present invention.
Figure 2:
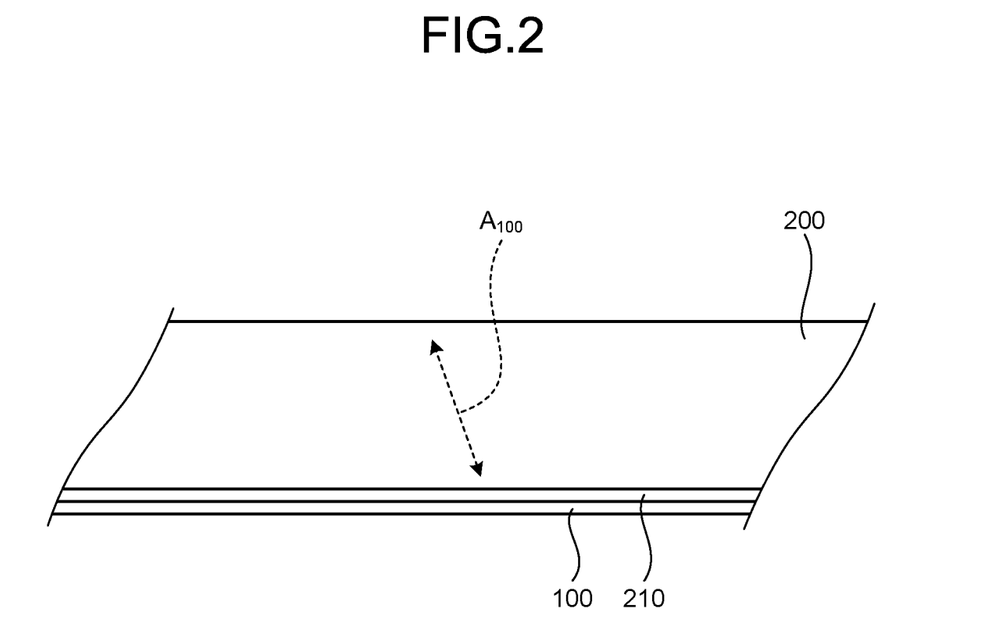
FIG. 2 is a perspective view schematically showing a multilayer film obtained in a second step of the method for producing a broadband wavelength film according to an embodiment of the present invention.
Figure 3:
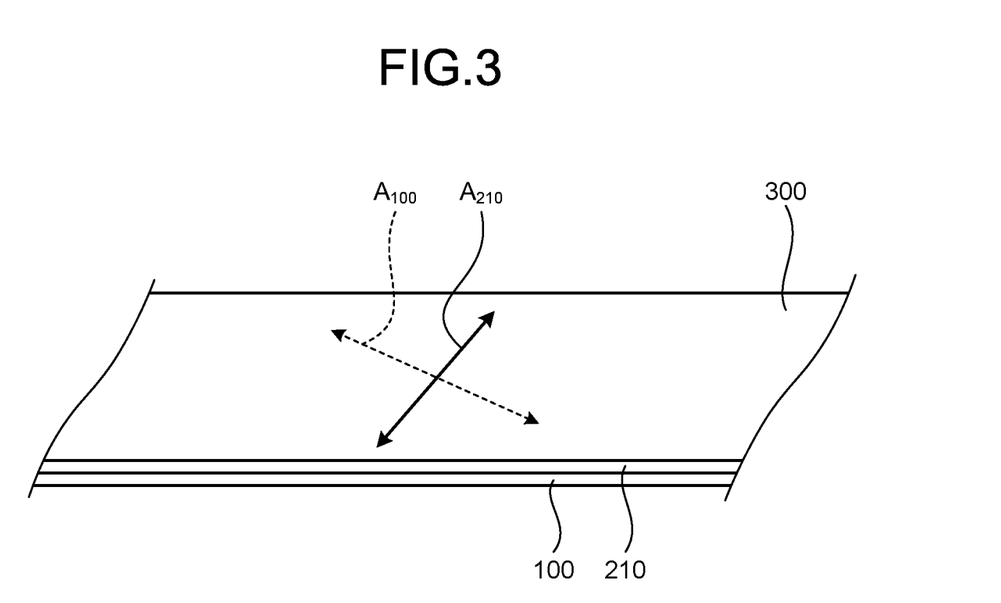
FIG. 3 is a perspective view schematically showing a broadband wavelength film obtained in a third step of the method for producing a broadband wavelength film according to an embodiment of the present invention.

FIG. 1 is a perspective view schematically showing a layer (A) 100 as a long-length obliquely stretched film prepared in a first step of the method for producing the broadband wavelength film according to an embodiment of the present invention. FIG. 2 is a perspective view schematically showing a multilayer film 200 obtained in a second step of the method for producing the broadband wavelength film according to an embodiment of the present invention. FIG. 3 is a perspective view schematically showing a broadband wavelength film 300 obtained in a third step of the method for producing the broadband wavelength film according to an embodiment of the present invention.

The method for producing the broadband wavelength film 300 according to the embodiment of the present invention comprises, in this order:

(1) a first step of preparing a layer (A) 100 as a long-length obliquely stretched film as shown in FIG. 1;

(2) a second step of forming on the layer (A) 100 a layer (B) 210 of a resin having a negative intrinsic birefringence to obtain a multilayer film 200 shown in FIG. 2; and (3) a third step of stretching the multilayer film 200 to obtain a long-length broadband wavelength film 300 shown in FIG. 3.

Since the layer (A) 100 prepared in the first step is an obliquely stretched film, the layer usually has a slow axis $A_{100}$ in its oblique direction, as shown in FIG. 1. In the second step, after the layer (B) 210 has been formed on this layer (A) 100 to obtain the multilayer film 200 shown in FIG. 2, the multilayer film 200 is stretched. Consequently, the direction of the slow axis $A_{100}$ and the optical properties of the layer (A) 100 are adjusted as shown in FIG. 3. Also, by the stretching of the multilayer film 200, a slow axis $A_{210}$ usually appears in the layer (B) to express the optical properties. The layer (A) 100 after stretching functions as one of a λ/2 layer and a λ/4 layer, and the layer (B) 210 after stretching functions as the other of a λ/2 layer and a λ/4 layer. Therefore, the broadband wavelength film 300 including a λ/2 layer and a λ/4 layer is obtained.

Hereinafter, the aforementioned production method will be described in detail.

[2. First Step]

In the first step, the layer (A) as a long-length obliquely stretched film is prepared. As the layer (A), an obliquely stretched film obtained by stretching a long-length resin film in an oblique direction of the resin film is usually used. As the obliquely stretched film, a film having a multilayer structure including two or more layers may be used, but a film having a single layer structure including only one layer is usually used.

As the resin for forming the resin film, a thermoplastic resin containing a polymer and further containing an optional component if necessary may be used. In particular, although a resin having a negative intrinsic birefringence may be used as the resin included in the layer (A), it is preferable to use a resin having a positive intrinsic birefringence because the production of a broadband wavelength film can be particularly easily performed.

The resin having a positive intrinsic birefringence usually includes a polymer having a positive intrinsic birefringence. Examples of the polymers having a positive intrinsic birefringence may include a polyolefin such as polyethylene and polypropylene; a polyester such as polyethylene terephthalate and polybutylene terephthalate; a polyarylene sulfide such as polyphenylene sulfide; a polyvinyl alcohol; a polycarbonate; a polyarylate; a cellulose ester polymer, a polyethersulfone; a polysulfone; a polyallylsulfone; a polyvinylchloride; a cyclic olefin polymer such as a norbornene polymer; and a rod-like liquid crystal polymer. As these polymers, one type thereof may be solely used, and two or more types thereof may also be used in combination at any ratio. The polymer may be a homopolymer or a copolymer. Among these, a polycarbonate polymer is preferable from the viewpoint of excellent retardation expressibility and low-temperature stretchability, and a cyclic olefin polymer is preferable from the viewpoint of excellent mechanical properties, heat resistance, transparency, low hygroscopicity, size stability, and light-weight property.

The ratio of the polymer in the resin included in the layer (A) is preferably 50% by weight to 100% by weight, more preferably 70% by weight to 100% by weight, and particularly preferably 90% by weight to 100% by weight. When the ratio of the polymer falls within the aforementioned range, sufficient heat resistance and transparency can be imparted to the layer (A) and the broadband wavelength film.

The resin included in the layer (A) may further include an optional component other than the polymer in combination with the polymer. Examples of the optional components may include a colorant such as a pigment and a dye; a plasticizer; a fluorescent brightener; a dispersant; a thermal stabilizer; a light stabilizer; an ultraviolet absorber; an antistatic agent; an antioxidant; a microparticle; and a surfactant. As each of these components, one type thereof may be solely used, and two or more types thereof may also be used in combination at any ratio.

The glass transition temperature TgA of the resin included in the layer (A) is preferably 100° C. or higher, more preferably 110° C. or higher, and particularly preferably 120° C. or higher, and is preferably 190° C. or lower, more preferably 180° C. or lower, and particularly preferably 170°

C. or lower. By setting the glass transition temperature of the resin included in the layer (A) to be equal to or higher than the lower limit value of the aforementioned range, durability of the layer obtained by stretching the layer (A) in a high temperature environment can be enhanced. Further, by setting the value to be equal to or lower than the upper limit value, the stretching treatment can be easily performed.

Since the layer (A) is an obliquely stretched film, the layer usually has a slow axis in the oblique direction. The orientation angle formed by the slow axis with respect to the width direction of the layer (A) may be optionally set within a range in which a desired broadband wavelength film is obtained. For example, when the multilayer film is stretched in the lengthwise direction of the multilayer film in the third step, the orientation angle of the layer obtained by stretching the layer (A) in the third step becomes larger than the orientation angle of the layer (A). Therefore, in this case, it is preferable to set the orientation angle of the layer (A) to be smaller than the orientation angle of the layer obtained by stretching the layer (A) in the third step.

The specific orientation angle of the layer (A) is preferably greater than 15°, more preferably greater than 17°, and particularly preferably greater than 20°, and is preferably smaller than 50°, more preferably smaller than 49°, and particularly preferably smaller than 48°. When the orientation angle of the layer (A) falls within the aforementioned range, by stretching the multilayer film in the later-described preferable stretching direction in the third step, a broadband wavelength film having preferable optical properties can be easily obtained.

The optical properties such as a retardation and an NZ factor of the layer (A) may be set according to the optical properties of the layer obtained by stretching the layer (A). For example, when the layer (A) is stretched to obtain a λ/2 layer, the in-plane retardation of the layer (A) is preferably 140 nm or more, more preferably 150 nm or more, and particularly preferably 160 nm or more, and is preferably 250 nm or less, more preferably 240 nm or less, and particularly preferably 230 nm or less.

The thickness of the layer (A) may be optionally set within a range in which a desired broadband wavelength film is obtained. The specific thickness of the layer (A) is preferably 20 μm or more, more preferably 25 μm or more, and particularly preferably 30 μm or more, and is preferably 100 μm or less, more preferably 95 μm or less, and particularly preferably 90 μm or less. When the thickness of the layer (A) falls within the aforementioned range, a λ/2 layer or a λ/4 layer having desired optical properties can be easily obtained by the stretching in the third step.

The layer (A) may be produced by a production method including stretching a pre-stretch film as a suitable long-length resin film in an oblique direction of the pre-stretch film.

The pre-stretch film may be produced, for example, by a melt molding method or a solution casting method. More specific examples of the melt molding methods may include an extrusion molding method, a press molding method, an inflation molding method, an injection molding method, a blow molding method, and a stretch molding method. Among these methods, in order to obtain a layer (A) excellent in mechanical strength and surface accuracy, an extrusion molding method, an inflation molding method, or a press molding method is preferable, and among these, an extrusion molding method is particularly preferable from the viewpoint of being able to produce the layer (A) efficiently and easily.

After the long-length pre-stretch film has been prepared, the long-length pre-stretch film is stretched in an oblique direction to obtain the layer (A) as an obliquely stretched film.

Since the slow axis of the layer (A) is usually expressed by stretching the pre-stretch film in an oblique direction, it is preferable to set the stretching direction of the pre-stretch film in accordance with the direction of the slow axis of the layer (A). For example, when the pre-stretch film and the layer (A) are formed of a resin having a positive intrinsic birefringence, it is preferable to set the stretching direction of the pre-stretch film in a direction parallel to the slow axis of the layer (A). Further, for example, when the pre-stretch film and the layer (A) are formed of a resin having a negative intrinsic birefringence, it is preferable to set the stretching direction of the pre-stretch film in a direction perpendicular to the slow axis of the layer (A).

The stretching ratio in the stretching to obtain the layer (A) is preferably 1.1 times or more, and more preferably 1.2 times or more, and is preferably 4.0 times or less, and more preferably 3.0 times or less. By setting the stretching ratio to be equal to or greater than the lower limit value of the aforementioned range, the refractive index in the stretching direction can be increased. By setting the stretching ratio to be equal to or smaller than the upper limit value, the direction of the slow axis of the layer obtained by stretching the layer (A) can be easily controlled.

The stretching temperature in the stretching to obtain the layer (A) is preferably TgA° C. or higher, more preferably "TgA+2° C." or higher, and particularly preferably "TgA+5° C." or higher, and is preferably "TgA+40° C." or lower, more preferably "TgA+35° C." or lower, and particularly preferably "TgA+30° C." or lower. Herein, TgA refers to the glass transition temperature of the resin included in the layer (A). When the stretching temperature falls within the aforementioned range, the molecules included in the pre-stretch film can be reliably oriented, so that the layer (A) having desired optical properties can be easily obtained.

The above-described stretching is usually performed by using a tenter stretching machine while continuously conveying the pre-stretch film in the lengthwise direction. As the tenter stretching machine, for example, those described in Patent Literature 1 may be used.

[3. Fourth Step]

The method for producing the broadband wavelength film may include a step of, after the layer (A) has been prepared in the first step, forming a thin film layer on the layer (A) if necessary. By forming an appropriate thin film layer, the thin film layer functions as an adhesion facilitating layer, and the binding strength between the layers (A) and (B) can be enhanced. Further, it is preferable that the thin film layer has solvent resistance. Such a thin film layer is usually formed of a resin.

Examples of the material of the thin film layer may include an acrylic resin, a urethane resin, an acrylic urethane resin, an ester resin, and an ethyleneimine resin. The acrylic resin is a resin containing an acrylic polymer. The urethane resin is a resin containing a polyurethane. Polymers such as acrylic polymers and polyurethanes usually have high binding strength to a wide variety of resins, so that the binding strength between layers (A) and (B) can be enhanced. As these polymers, one type thereof may be solely used, and two or more types thereof may also be used in combination at any ratio.

The resin as the material of the thin film layer may contain, in combination with the polymer, optional components such as a heat-resistant stabilizer, a weather-resistant stabilizer, a leveling agent, an antistatic agent, a slip agent, an antiblocking agent, an antifogging agent, a lubricant, a dye, a pigment, a natural oil, a synthetic oil, a wax, particles, and the like. As each of the optional components, one type thereof may be solely used, and two or more types thereof may also be used in combination at any ratio.

The glass transition temperature of the resin as the material of the thin film layer is preferably lower than the glass transition temperature TgA of the resin included in the layer (A) and the glass transition temperature TgB of the resin having a negative intrinsic birefringence included in the layer (B). In particular, the difference between the glass transition temperature of the resin as the material of the thin film layer and the lower one of the glass transition temperatures TgA and TgB is preferably 5° C. or higher, more preferably 10° C. or higher, and particularly preferably 20° C. or higher. By having such a temperature relationship, the expression of retardation in the thin film layer due to the stretching in the third step can be suppressed, so that the thin film layer in the broadband wavelength film can have optical isotropy. Consequently, it is possible to easily adjust the optical properties of the broadband wavelength film.

The thin film layer may be formed by, for example, a method including coating the layer (A) with a coating liquid containing the resin as the material of the thin film layer and a solvent. As the solvent, water may be used. Alternatively, an organic solvent may also be used. Examples of the organic solvent may include the same solvents as those which may be used for forming the layer (B) that will be described later. As the solvents, one type thereof may be solely used, and two or more types thereof may also be used in combination at any ratio.

Further, the coating liquid may contain a crosslinking agent. By using the crosslinking agent, mechanical strength of the thin film layer can be increased, and binding property of the thin film layer to the layer (A) and the layer (B) can be increased. Examples of the crosslinking agent that can be used may include an epoxy compound, an amino compound, an isocyanate compound, a carbodiimide compound, and an oxazoline compound. As these agents, one type thereof may be solely used, and two or more types thereof may also be used in combination at any ratio. The amount of the crosslinking agent is preferably 1 part by weight or more, and more preferably 5 parts by weight or more, and is preferably 70 parts by weight or less, and more preferably 65 parts by weight or less, relative to 100 parts by weight of the polymer in the coating liquid.

Examples of the coating method with the coating liquid may include the same method as the coating method that may be used for forming the layer (B) that will be described later.

By coating the layer (A) with a coating liquid, the thin film layer may be formed. The thin film layer may be subjected to a curing treatment such as drying and crosslinking, if necessary. Examples of the drying method may include heat drying using an oven. Examples of the crosslinking method may include methods such as heat treatment, and irradiation treatment with active energy rays such as ultraviolet rays.

[4. Second Step]

After the layer (A) has been prepared in the first step and the thin film layer has been formed if necessary, the second step of forming the layer (B) of a resin having a negative intrinsic birefringence to obtain a multilayer film is performed. In this second step, the layer (B) is formed on the layer (A) directly or indirectly via an optional layer such as the thin film layer. "Direct" used herein means that there is no optional layer between the layers (A) and (B).

Usually the resin having a negative intrinsic birefringence is a thermoplastic resin and includes a polymer having a negative intrinsic birefringence. Examples of the polymers having a negative intrinsic birefringence may include a homopolymer of styrene or a styrene derivative, and a polystyrene-based polymer including a copolymer of styrene or a styrene derivative with an optional monomer; a polyacrylonitrile polymer; a polymethylmethacrylate polymer; and multiple copolymers of these; and a cellulose compound such as a cellulose ester. Examples of the optional monomer which can be preferably copolymerized with styrene or a styrene derivative may include acrylonitrile, maleic anhydride, methyl methacrylate, and butadiene. Among these, a polystyrene-based polymer and a cellulose compound are preferable. As these polymers, one type thereof may be solely used, and two or more types thereof may also be used in combination at any ratio.

The ratio of the polymer in the resin having a negative intrinsic birefringence is preferably 50% by weight to 100% by weight, more preferably 70% by weight to 100% by weight, and particularly preferably 90% by weight to 100% by weight. When the ratio of the polymer falls within the aforementioned range, the layer obtained by stretching the layer (B) can express appropriate optical properties.

It is preferable that the resin having a negative intrinsic birefringence included in the layer (B) contains a plasticizer. By using a plasticizer, the glass transition temperature TgB of the resin included in the layer (B) can be appropriately adjusted. Examples of the plasticizers may include a phthalate ester, a fatty acid ester, a phosphate ester, and an epoxy derivative. Specific examples of the plasticizer may include substances described in Japanese Patent Application Laid-Open No. 2007-233114 A. As the plasticizer, one type thereof may be solely used, and two or more types thereof may also be used in combination at any ratio.

Among the plasticizers, a phosphate ester is preferable because it is easily available and inexpensive. Examples of the phosphate ester may include a trialkyl phosphate such as triethyl phosphate, tributyl phosphate, and trioctyl phosphate; a halogen-containing trialkyl phosphate such as trichloroethyl phosphate; a triaryl phosphate such as triphenyl phosphate, tricresyl phosphate, tris(isopropylphenyl) phosphate, and cresyl diphenyl phosphate; an alkyl-diaryl phosphate such as octyldiphenyl phosphate; and a tri (alkoxyalkyl) phosphate such as tri(butoxyethyl) phosphate.

The amount of the plasticizer is preferably 0.001% by weight or more, more preferably 0.005% by weight or more, and particularly preferably 0.1% by weight or more, and is preferably 20% by weight or less, more preferably 18% by weight or less, and particularly preferably 15% by weight or less, relative to 100% by weight of the amount of the resin having a negative intrinsic birefringence contained in the layer (B). When the amount of the plasticizer is confined within the aforementioned range, the glass transition temperature TgB of the resin included in the layer (B) can be appropriately adjusted. Thus, it is possible to perform appropriate stretching in the third step to obtain a desired broadband wavelength film.

The resin having a negative intrinsic birefringence may further include an optional component other than the polymer and the plasticizer in combination with the polymer and the plasticizer. Examples of the optional components may include the same examples as the optional components that may be included in the resin included in the layer (A). As the optional components, one type thereof may be solely used, and two or more types thereof may also be used in combination at any ratio.

The glass transition temperature TgB of the resin having a negative intrinsic birefringence included in the layer (B) is preferably 80° C. or higher, more preferably 90° C. or higher, further preferably 100° C. or higher, still further preferably 110° C. or higher, and particularly preferably 120° C. or higher. Such a high glass transition temperature TgB of the resin having a negative intrinsic birefringence makes it possible to reduce orientation relaxation of the resin having a negative intrinsic birefringence. The upper limit of the glass transition temperature TgB of the resin having a negative intrinsic birefringence is not particularly limited, but is usually 200° C. or lower.

From the viewpoint of adjusting the optical properties of both the layer (A) and the layer (B) in appropriate ranges by the stretching in the third step, it is preferable that the glass transition temperature TgA of the resin included in the layer (A) and the glass transition temperature TgB of the resin having a negative intrinsic birefringence included in the layer (B) are not excessively different from each other. Specifically, the absolute value |TgA-TgB| of the difference between the glass transition temperature TgA and the glass transition temperature TgB is preferably 20° C. or lower, more preferably 15° C. or lower, and particularly preferably 10° C. or lower.

The layer (B) may have an in-plane retardation and a slow axis. If the layer (B) has an in-plane retardation and a slow axis, the in-plane retardation and the slow axis of the layer (B) may be adjusted by the stretching in the third step. However, setting of the stretching conditions for performing such adjustment is likely to be complicated. Therefore, from the viewpoint of easily obtaining the desired optical properties and the slow axis direction in the layer (B) after stretching in the third step, it is preferable that the layer (B) formed in the second step has no in-plane retardation and slow axis or, even if it has, the in-plane retardation is small.

Specifically, the in-plane retardation of the layer (B) is preferably 0 nm to 20 nm, more preferably 0 nm to 15 nm, and particularly preferably 0 nm to 10 nm.

The thickness of the layer (B) may be optionally set within a range in which a desired broadband wavelength film can be obtained. The specific thickness of the layer (B) is preferably 3 μm or more, more preferably 4 μm or more, and particularly preferably 5 μm or more, and is preferably 15 μm or less, more preferably 13 μm or less, and particularly preferably 11 μm or less. When the thickness of the layer (B) falls within the aforementioned range, a λ/2 layer or a λ/4 layer having desired optical properties can be easily obtained by stretching.

The method for forming the layer (B) is not particularly limited, and for example, a coating method, an extrusion method, a bonding method, or the like forming method may be used.

When the layer (B) is formed by a coating method, the second step includes coating the layer (A) with a composition containing a resin having a negative intrinsic birefringence. The composition is usually a liquid composition which further includes a solvent in combination with the resin having a negative intrinsic birefringence. Examples of the solvents may include methyl acetate, ethyl acetate, acetone, methyl ethyl ketone, 3-methyl-2-butanone, methyl isobutyl ketone, tetrahydrofuran, cyclopentyl methyl ether, acetylacetone, cyclohexanone, 2-methylcyclohexanone, 1,3-dioxolane, 1,4-dioxane, 2-pentanone, and N,N-dimethylformamide. As the solvents, one type thereof may be solely used, and two or more types thereof may also be used in combination at any ratio.

Examples of the methods for coating with the composition may include a curtain coating method, an extrusion coating method, a roll coating method, a spin coating method, a dip coating method, a bar coating method, a spray coating method, a slide coating method, a print coating method, a gravure coating method, a die coating method, a gap coating method, and a dipping method.

In the coating method, the second step includes, after the layer (A) is coated with the composition, drying the coating composition if necessary. The solvent can be removed by drying to form on the layer (A) the layer (B) of the resin having a negative intrinsic birefringence. The drying may be performed by, for example, a drying method such as natural drying, heating drying, vacuum drying, vacuum heating drying, or the like.

When the layer (B) is formed by an extrusion method, the second step includes extruding on the layer (A) a resin having a negative intrinsic birefringence. The extrusion of the resin is usually performed in a state in which the resin is melted. The resin is usually extruded into a film using a die. The extruded resin having a negative intrinsic birefringence adheres to the layer (A) or the thin film layer, whereby the layer (B) of the resin having a negative intrinsic birefringence can be formed on the layer (A). When the layer (B) is formed by an extrusion method, the second step usually includes cooling and curing the resin having a negative intrinsic birefringence that has been extruded and adhered to the layer (A).

When the layer (B) is formed by a bonding method, the second step includes bonding to the layer (A) a film of a resin having a negative intrinsic birefringence. Examples of the method for producing the film of a resin having a negative intrinsic birefringence may include a melt molding method such as an extrusion molding method, an inflation molding method, and a press molding method; and a solution casting method. If necessary, an adhesive or a tackiness agent may be used upon bonding the layer (A) and the film of the resin having a negative intrinsic birefringence.

Among the above-described methods for forming the layer (B), the coating method is preferable. Generally, resins having a negative intrinsic birefringence tend to have low mechanical strength. However, according to the coating method, the layer (B) can be easily formed even while the resin having such low mechanical strength is used. In this regard, in an example wherein a bonding method is used, the layer (B) may be formed on an appropriate supporting film and the layer (B) may be bonded to the layer (A), whereby it is possible to form the layer (B) on the layer (A) while suppressing breakage of the layer (B). However, the coating method can reduce the number of steps required to form the layer (B) compared to the bonding method which performs many steps of forming the layer (B) on the supporting film and transferring the layer (B) from the supporting film to the layer (A). Further, according to the coating method, an adhesive and a tackiness agent are not required. Further, in the coating method, thickness reduction of the layer (B) itself is easier than in the extrusion method. Therefore, from the viewpoint of obtaining a thin broadband wavelength film through a smaller number of steps, it is preferable to form the layer (B) by the coating method.

[5. Third Step]

After the multilayer film including the layer (A) and the layer (B) has been obtained in the second step, the third step of stretching the multilayer film to obtain a long-length broadband wavelength film is performed. By the stretching in the third step, the direction of the slow axis of the layer (A) is adjusted as well as the optical properties of the layer (A) are adjusted to obtain one of the λ/2 layer and the λ/4 layer. Further, by the stretching in the third step, the slow axis appears in the layer (B) and the optical properties are expressed in the layer (B) to obtain the other one of the λ/2 layer and the λ/4 layer.

The stretching in the third step is usually performed in only one direction. The stretching direction in this third step is preferably set so as to obtain a desired broadband wavelength film.

For example, when the layer (A) is a layer of a resin having a positive intrinsic birefringence, the direction of the slow axis of the layer (A) is allowed to change so as to approach the stretching direction by the stretching in the third step. Further, for example, when the layer (A) is a layer of a resin having a negative intrinsic birefringence, the direction of the slow axis of the layer (A) is allowed to change so as to approach the direction perpendicular to the stretching direction by stretching in the third step. Thus, the direction of the slow axis of the layer (A) is usually changed by the stretching in the third step. Further, in the layer (B), the slow axis appears in the direction perpendicular to the stretching direction by the stretching in the third step. Therefore, it is preferable that the stretching direction in the third step is set such that the λ/2 layer and the λ/4 layer having the slow axis in the desired directions are obtained by the change of the direction of the slow axis in the layer (A) and by the expression of the slow axis in the layer (B) as described above.

Among these, the third step preferably includes stretching the multilayer film in a stretching direction which forms an angle of 90°±20° with respect to the width direction of the multilayer film. More specifically, the angle formed by the stretching direction in the third step with respect to the width direction of the multilayer film is preferably in the range of 90°±20°, more preferably 90°±15°, and further more preferably 90°±10°. Among these, it is preferable that the stretching in the third step is performed in the lengthwise direction of the multilayer film at an angle of 90° with respect to the width direction of the multilayer film. By performing the stretching in such a stretching direction, it is possible to easily control the direction of the slow axis.

The stretching ratio in the third step is preferably 1.1 times or more, more preferably 1.15 times or more, and particularly preferably 1.2 times or more, and is preferably 2.0 times or less, more preferably 1.8 times or less, and particularly preferably 1.6 times or less. By setting the stretching ratio in the third step to be equal to or greater than the lower limit value of the aforementioned range, it is possible to suppress occurrence of wrinkles. In addition, by setting the value to be equal to or smaller than the upper limit value, the direction of the slow axis can be easily controlled.

It is preferable that the stretching temperature in the third step satisfies both the following conditions (C1) and (C2) with respect to the glass transition temperature TgA of the resin included in the layer (A) and the glass transition temperature TgB of the resin having a negative intrinsic birefringence included in the layer (B).

(C1) The stretching temperature is preferably a temperature of TgA−20° C. or higher, more preferably TgA−10° C. or higher, and particularly preferably TgA−5° C. or higher, and is preferably TgA+30° C. or lower, more preferably TgA+25° C. or lower, and particularly preferably TgA+20° C. or lower.

(C2) The stretching temperature is preferably a temperature of TgB−20° C. or higher, more preferably TgB−10° C. or higher, and particularly preferably TgB−5° C. or higher, and is preferably TgB+30° C. or lower, more preferably TgB+25° C. or lower, and particularly preferably TgB+20° C. or lower.

By stretching at such a stretching temperature, the optical properties of the layer (A) can be appropriately adjusted, and the desired optical properties can be expressed in the layer (B). Thus, a broadband wavelength film having desired optical properties can be obtained.

It is preferable that the stretching in the third step is performed by free uniaxial stretching. Herein, the term "free uniaxial stretching" refers to stretching in a certain one direction without applying a restraining force in a direction other than the stretching direction. Thus, for example, free uniaxial stretching of the multilayer film in the lengthwise direction refers to stretching in the lengthwise direction which is performed without restraining the ends of the multilayer film in the width direction. By performing free uniaxial stretching in the third step, it is possible to easily control the respective slow axis directions of the λ/2 layer and the λ/4 layer, and it is possible to easily obtain the λ/2 layer and the λ/4 layer each having a preferable NZ factor.

The stretching in the third step described above may be performed using any stretching machine, for example, a tenter stretching machine or a roll stretching machine. In particular, when the multilayer film is stretched in the lengthwise direction of the multilayer film in the third step, it is preferable to use a roll stretching machine. With the roll stretching machine, the free uniaxial stretching can be easily performed. Free uniaxial stretching using a roll stretching machine is usually performed while a long-length multilayer film is continuously conveyed in the lengthwise direction. As the roll stretching machine, for example, those described in Patent Literature 1 may be used.

[6. Broadband Wavelength Film]

By the above-described production method, the long-length broadband wavelength film is obtained as a co-stretched film including a λ/2 layer and a λ/4 layer. In the above-described production method, the layer (A) and the layer (B) are stretched together, instead of separately like in the prior art, in the third step. This can reduce the number of stretching operations compared to that in the prior art. Therefore, the number of steps required for production of the broadband wavelength film can be reduced. Thus, efficient production can be achieved. Moreover, in the aforementioned production method in which the multilayer film is stretched for co-stretching the layer (A) and the layer (B) to obtain the broadband wavelength film, the displacement in the slow axis direction due to bonding is not caused, unlike in a prior art production method in which a λ/2 layer and a λ/4 layer are separately produced and these are then bonded. Accordingly, the slow axis direction of each of the λ/2 layer and the λ/4 layer can be easily controlled in a precise manner. Therefore, there can be easily obtained a high-quality broadband wavelength film which can achieve a circular polarization film capable of efficiently suppressing the coloring.

In the broadband wavelength film obtained in this manner, the λ/2 layer is a layer obtained by stretching one of the layer (A) and the layer (B), and the λ/4 layer is a layer obtained by stretching the other of the layer (A) and the layer (B). In particular, for facilitating the production of the broadband wavelength film, the λ/2 layer is preferably a layer obtained by stretching the layer (A), and the λ/4 layer is preferably a layer obtained by stretching the layer (B). Therefore, the λ/2 layer is preferably a layer formed of the same resin as that for the layer (A), and the λ/4 layer is preferably a layer formed of the same resin as that for the layer (B).

The λ/2 layer is a layer having an in-plane retardation of usually 240 nm or more and usually 300 nm or less at a measurement wavelength of 590 nm. When the λ/2 layer has such an in-plane retardation, a broadband wavelength film can be realized by the combination of the λ/2 layer and the λ/4 layer. Accordingly, by the combination of this broadband wavelength film with a linear polarization film, it is possible to realize a broadband circular polarization film having a function of absorbing one of clockwise circularly polarized light and counterclockwise circularly polarized light and allowing the remaining light to pass therethrough in a broad wavelength range. When such a circular polarization film is disposed on the display surface of an image display device, reflection of light in a wide wavelength range can be suppressed in both the front direction and the tilt direction. Furthermore, since light reflection can be suppressed in a wide wavelength range as previously described, this circular polarization film can suppress the coloring on the display surface caused by increased reflection strength of light in a part of the wavelength range. In particular, for effectively reducing the coloring when observed from a tilt direction, the in-plane retardation of the λ/2 layer at a measurement wavelength of 590 nm is preferably 250 nm or more, and is preferably 280 nm or less, and more preferably 265 nm or less.

The thickness direction retardation of the λ/2 layer at a measurement wavelength of 590 nm is preferably 120 nm or more, more preferably 125 nm or more, and particularly preferably 130 nm or more, and is preferably 240 nm or less, more preferably 230 nm or less, and particularly preferably 220 nm or less. When the thickness direction retardation of the λ/2 layer falls within the aforementioned range, the function of suppressing coloring in the tilt direction by the circular polarization film can be further enhanced.

The NZ factor of the λ/2 layer is preferably 1.0 or more, and more preferably 1.05 or more, and is preferably 1.3 or less, more preferably 1.25 or less, and particularly preferably 1.20 or less. When the NZ factor of the λ/2 layer falls within the aforementioned range, the function of suppressing coloring in the tilt direction by the circular polarization film can be further enhanced. In addition, the λ/2 layer having such an NZ factor can be easily produced.

The optical properties such as the retardation and the NZ factor of the λ/2 layer may be adjusted by, for example, the retardation and thickness of the layer (A) prepared in the first step; and the stretching conditions such as a stretching temperature, a stretching ratio, a stretching direction, and the like in the third step.

From the viewpoint of achieving the function as a broadband wavelength film by the combination of the λ/2 layer and the λ/4 layer, the λ/2 layer preferably has a slow axis in a direction corresponding to the direction of the slow axis of the λ/4 layer. In general, when a film includes a combination of a λ/4 layer having a slow axis that forms an angle θ(λ/4) with respect to a given reference direction (for example, the lengthwise direction of the film) and a λ/2 layer having a slow axis that forms an angle θ(λ/2) with respect to the reference direction, and this film satisfies formula X: "θ(λ/4)=2θ(λ/2)+45°", the film serves as a broadband wavelength film which can give light passing therethrough the in-plane retardation of substantially ¼ wavelength of the wavelength of the light in a wide wavelength range (see Japanese Patent Application Laid-Open No. 2007-004120 A). Therefore, in the aforementioned broadband wavelength film, the slow axis of the λ/2 layer and the slow axis of the λ/4 layer preferably satisfy the relationship close to that expressed by the aforementioned formula X. Specifically, the angle formed between the slow axis of the λ/2 layer and the slow axis of the λ/4 layer is preferably 67.5°±10°, more preferably 67.5°±5°, and particularly preferably 67.5°±3°.

A common linear polarization film has a transmission axis in its width direction and an absorption axis in its lengthwise direction. From the viewpoint of combining with such a common linear polarization film for obtaining a broadband wavelength film which can achieve a circular polarization film, the orientation angle formed by the slow axis of the λ/2 layer with respect to the width direction of the broadband wavelength film is preferably 67.5°±10°, more preferably 67.5°±5°, and particularly preferably 67.5°±3°.

The direction of the slow axis of the λ/2 layer may be adjusted by, for example, the direction of the slow axis of the layer (A) prepared in the first step; and the stretching conditions such as the stretching direction and the stretching ratio in the third step.

The thickness of the λ/2 layer is preferably 20 μm or more, more preferably 25 μm or more, and further more preferably 30 μm or more, and is preferably 80 μm or less, more preferably 70 μm or less, and further more preferably 60 μm or less. Thereby the mechanical strength of the λ/2 layer can be increased.

The λ/4 layer is a layer having an in-plane retardation of usually 110 nm or more and usually 154 nm or less at a measurement wavelength of 590 nm. When the λ/4 layer has such an in-plane retardation, a broadband wavelength film can be realized by the combination of the λ/2 layer and the λ/4 layer. Accordingly, by the combination of this broadband wavelength film with a linear polarization film, a broadband circular polarization film can be realized. By providing the circular polarization film in an image display device, reflection of light in a wide wavelength range can be reduced in both the front direction and the tilt direction, and coloring on the display surface can be suppressed. In particular, for particularly effectively reducing the coloring when observed from the tilt direction, the in-plane retardation of the λ/4 layer at the measurement wavelength of 590 nm is preferably 118 nm or more, preferably 138 nm or less, and more preferably 128 nm or less.

The thickness direction retardation of the λ/4 layer at a measurement wavelength of 590 nm is preferably 100 nm or more, more preferably 110 nm or more, and particularly preferably 120 nm or more, and is preferably 180 nm or less, more preferably 170 nm or less, and particularly preferably 160 nm or less. When the thickness direction retardation of the λ/4 layer falls within the aforementioned range, the function of suppressing coloring in the tilt direction by the circular polarization film can be further enhanced.

The NZ factor of the λ/4 layer is preferably −1.0 or more, more preferably −0.6 or more, and particularly preferably −0.4 or more, and is preferably 0.5 or less, more preferably 0.3 or less, further more preferably 0.1 or less, and particularly preferably 0.0 or less. Among these, the NZ factor of the λ/4 layer is particularly preferably −0.2±0.2. When the NZ factor of the λ/4 layer falls within the aforementioned range, the function of suppressing coloring in the tilt direction by the circular polarization film can be further enhanced. In addition, the λ/4 layer having such an NZ factor can be easily produced.

The optical properties such as the retardation and the NZ factor of the λ/4 layer may be adjusted by, for example, the thickness of the layer (B) formed in the second step; and the stretching conditions such as the stretching temperature, the stretching ratio, and the stretching direction in the third step.

The λ/4 layer usually has a slow axis which is expressed in a direction perpendicular to the stretching direction in the third step by stretching in the third step. In this case, the orientation angle formed by the slow axis of the λ/4 layer with respect to the width direction of the broadband wavelength film is preferably 0°±20°, more preferably 0°±10°, and particularly preferably 0°±5°. The broadband wavelength film including the λ/4 layer having such a slow axis may be combined with a common linear polarization film having a transmission axis in a width direction and an absorption axis in a lengthwise direction to realize a circular polarization film.

The direction of the slow axis of the λ/4 layer may be adjusted, for example, by the stretching direction in the third step.

The thickness of the λ/4 layer is preferably 3 μm or more, more preferably 4 μm or more, and particularly preferably 5 μm or more, and is preferably 15 μm or less, more preferably 13 μm or less, and particularly preferably 10 μm or less. By setting the thickness of the λ/4 layer to be equal to or more than the lower limit value of the aforementioned range, desired optical properties can be easily obtained, and by setting the thickness to be equal to or less than the upper limit value, the thickness of the broadband wavelength film can be reduced.

It is preferable that the λ/2 layer and the λ/4 layer are in direct contact with each other. This makes it possible to reduce the thickness of the broadband wavelength film.

When the method for producing the broadband wavelength film includes a fourth step of forming a thin film layer, the broadband wavelength film includes the thin film layer between the λ/2 layer and the λ/4 layer. While an adhesive layer used in a prior art production method of bonding a λ/2 layer and a λ/4 layer after both have been separately produced is generally as thick as 5 μm or more, the thin film layer of the broadband wavelength film obtained by the above-described production method can be made thinner than the adhesive layer. Specifically, the thickness of the thin film layer is preferably less than 2.0 μm, more preferably less than 1.8 μm, and particularly preferably less than 1.5 μm. Since the thin film layer can be thinned in this manner, the entire thickness of the broadband wavelength film can also be reduced. As to the lower limit of the thickness of the thin film layer, the thinner, the more preferable. For example, the lower limit may be 0.1 μm.

The broadband wavelength film may include an optional layer in combination with the λ/2 layer, the λ/4 layer, and the thin film layer. For example, the broadband wavelength film may include an adhesive layer or a tackiness agent layer for bonding the λ/2 layer and the λ/4 layer.

The total light transmittance of the broadband wavelength film is preferably 80% or more, more preferably 85% or more, and particularly preferably 88% or more. The light transmittance may be measured in accordance with JIS K0115 using a spectrophotometer in a wavelength range of 400 nm to 700 nm.

The haze of the broadband wavelength film is preferably 5% or less, more preferably 3% or less, particularly preferably 1% or less, and ideally 0%. Herein, as the haze, an average value of haze values measured in accordance with JIS K7361-1997 at five points by using a "Turbidmeter NDH-300A" manufactured by Nippon Denshoku Industries, Co., Ltd. may be adopted.

The thickness of the broadband wavelength film is preferably 30 μm or more, more preferably 35 μm or more, and particularly preferably 40 μm or more, and is preferably 100 μm or less, more preferably 90 μm or less, and particularly preferably 80 μm or less. According to the production method described above, it is possible to easily produce such a thin broadband wavelength film.

The above-described method for producing the broadband wavelength film may further include an optional step in combination with the first step, second step, and third step.

For example, the method for producing the broadband wavelength film may include a step of disposing a protective layer on the surface of the broadband wavelength film.

Also, for example, the method for producing the broadband wavelength film may include a step of subjecting one or two or more surfaces of the layer (A), the layer (B), and the thin film layer to a surface treatment such as a corona treatment and a plasma treatment at any time point. Therefore, for example, the surface of the layer (A) may be subjected to a surface treatment, and thereafter the layer (B) or the thin film layer may be formed on the treated surface. Also, for example, the surface of the thin film layer may be subjected to a surface treatment, and thereafter the layer (B) may be formed on the treated surface. When a surface treatment is performed, a binding property between layers can be enhanced on a surface having been subjected to the surface treatment.

[7. Method for Producing Circular Polarization Film]

Using the broadband wavelength film produced by the above-described production method, a long-length circular polarization film may be produced. Such a circular polarization film may be produced by a production method comprising a step of producing a broadband wavelength film by the above-described production method, and a step of bonding this broadband wavelength film and a long-length linear polarization film. The bonding is performed such that the linear polarization film, the λ/2 layer, and the λ/4 layer are aligned in this order in the thickness direction. For the bonding, an adhesive layer or a tackiness layer may be used if necessary.

The linear polarization film is a long-length film having an absorption axis, and has a function of absorbing linearly polarized light having a vibration direction parallel to the absorption axis and allowing other polarized light to pass therethrough. Herein, the vibration direction of linearly polarized light means the vibration direction of the electric field of linearly polarized light.

The linear polarization film usually includes a polarizer layer, and also includes, if necessary, a protective film layer for protecting the polarizer layer.

The polarizer layer for use may be obtained by, for example, subjecting a film of an appropriate vinyl alcohol-based polymer to an appropriate treatment in an appropriate order and scheme. Examples of such a vinyl alcohol-based polymer may include polyvinyl alcohol and partially formalized polyvinyl alcohol. Examples of the treatment to a film may include a dyeing treatment with a dichroic substance such as iodine and dichroic dye, a stretching treatment, and a cross-linking treatment. In the stretching treatment for producing the polarizer layer, a pre-stretch film is usually stretched in a lengthwise direction. Accordingly, an absorption axis parallel to the lengthwise direction of the polarizer layer may be expressed in the obtained polarizer layer. This polarizer layer can absorb linearly polarized light having a vibration direction parallel to the absorption axis. Particularly preferably, the polarizer layer has an excellent polarization degree. The thickness of the polarizer layer is generally 5 μm to 80 μm, although not limited thereto.

As the protective film layer for protecting the polarizer layer, any transparent film may be used. Among these, a film of a resin having excellent transparency, mechanical strength, thermal stability, moisture shielding property, and the like is preferable. Examples of such resins may include an acetate resin such as triacetyl cellulose, a polyester resin, a polyethersulfone resin, a polycarbonate resin, a polyamide resin, a polyimide resin, a polyolefin resin, a cyclic olefin resin, and a (meth)acrylic resin. Among these, an acetate resin, a cyclic olefin resin, and a (meth)acrylic resin are preferable in terms of small birefringence, and a cyclic olefin resin is particularly preferable in terms of transparency, low hygroscopicity, size stability, light-weight property, and the like.

The linear polarization film described above may be produced by, for example, bonding a long-length polarizer layer and a long-length protective film layer. For the bonding, an adhesive may be used if necessary.

The linear polarization film preferably has an absorption axis in the lengthwise direction of the linear polarization film. It is preferable that such a linear polarization film is bonded to a broadband wavelength film including a $\lambda/2$ layer having an orientation angle of $67.5°\pm10°$ and a $\lambda/4$ layer having an orientation angle of $0°\pm20°$ to produce a circular polarization film. According to the bonding of such a combination, a circular polarization film can be produced by bonding a long-length linear polarization film and a long-length broadband wavelength film in such a manner that their lengthwise directions are parallel to each other. This allows the production of the circular polarization film by a roll-to-roll method. Accordingly, production efficiency of the circular polarization film can be enhanced.

In the circular polarization film obtained in this manner, linearly polarized light in a broad wavelength range having passed through the linear polarization film is converted into circularly polarized light through the broadband wavelength film. Accordingly, the circular polarization film has a function of absorbing one of clockwise circularly polarized light and counterclockwise circularly polarized light and allowing the remaining light to pass therethrough in a broad wavelength range.

The circular polarization film described above may further include an optional layer in combination with the linear polarization film and the broadband wavelength film.

For example, the circular polarization film may include a protective film layer for suppressing scratches. Also, for example, the circular polarization film may include an adhesive layer or a tackiness layer for the adhesion between the linear polarization film and the broadband wavelength film.

When the circular polarization film is disposed on a plane that may reflect light, the reflection of outside light can be effectively reduced. In particular, the circular polarization film is useful in terms of effectively reducing the reflection of outside light in a broad wavelength range of the visible region. Since the reflection of outside light can be effectively reduced in a broad wavelength range in this manner, the circular polarization film can suppress the coloring caused by increased reflection strength of light in a part of the wavelength range. Furthermore, the circular polarization film can obtain the aforementioned effects of suppressing refection and coloring both in a front direction and in a tilt direction, and usually in all azimuth angles of the film principal surface.

Taking advantage of the aforementioned function of suppressing the reflection of outside light, the circular polarization film may be used as a reflection suppressing film for an organic electroluminescent display device (hereinafter, sometimes appropriately referred to as an "organic EL display device").

An organic EL display device includes a circular polarization film piece obtained by cutting it out from the long-length circular polarization film.

When an organic EL display device includes the circular polarization film piece, the organic EL display device usually includes the circular polarization film piece on its display surface. When the circular polarization film piece is disposed on the display surface of the organic EL display device in such a manner that the surface on the linear polarization film side faces the viewing side, light having entered the device can be inhibited from being reflected in the device and exiting the device. As a result, glare on the display surface of the display device can be suppressed. Specifically, among the light that has entered the device, only linearly polarized light which is a part thereof passes through the linear polarization film, and subsequently passes through the broadband wavelength film to become circularly polarized light. The circularly polarized light is reflected on a component (such as a reflective electrode) which reflects light in the display device, and again passes through the broadband wavelength film to become linearly polarized light having a vibration direction (polarization axis) in a direction orthogonal to the vibration direction (polarization axis) of the incident linearly polarized light. Such linearly polarized light does not pass through the linear polarization film. Thus, a reflection suppressing function is achieved. In addition, since the reflection suppressing function can be obtained in a broad wavelength range, the coloring on the display surface can be suppressed.

Furthermore, the circular polarization film may be provided to a liquid crystal display device. Such a liquid crystal display device includes a circular polarization film piece obtained by cutting it out from the long-length circular polarization film.

When the liquid crystal display device includes the circular polarization film piece in such a manner that the surface on the linear polarization film side faces the viewing side, light having entered the device can be inhibited from being reflected in the device and exiting the device. As a result, glare and coloring on the display surface of the display device can be suppressed.

Also, when the liquid crystal display device includes the circular polarization film piece in such a manner that the surface on the linear polarization film side faces the light source side, an image can be displayed with circularly polarized light, if the broadband wavelength film of this circular polarization film piece is located closer to the display surface than the liquid crystal cell of the liquid crystal display device. This enables the stable viewing of light exiting the display surface through polarizing sunglasses, and enhances the image visibility while polarizing sunglasses are worn.

Also, particularly when the circular polarization film piece is disposed in an image display device such as an organic EL display device and a liquid crystal display device in such a manner that the surface thereof on the linear polarization film side faces the viewing side, warpage of the display panel can be suppressed. Hereinafter, this effect will be described.

In general, an image display device includes a display panel containing a display element such as an organic electroluminescent element and a liquid crystal cell. This display panel includes a substrate such as a glass substrate for increasing the mechanical strength of the display panel.

The display panel, in which the circular polarization film piece is disposed in such a manner that the surface on the linear polarization film side faces the viewing side, usually includes the substrate, the broadband wavelength film, and the linear polarization film in this order.

The polarizer layer of the linear polarization film is generally likely to shrink in an in-plane direction in a high temperature environment. When the polarizer layer is going to shrink in this manner, stress to cause warpage of the display panel occurs in the display panel in which the linear polarization film containing the polarizer layer is disposed. The warpage of the display panel can deteriorate the image quality, and is therefore desired to be suppressed. The present inventor studied this warpage, and found that the larger the distance between the polarizer layer and the substrate of the display panel, the larger the warpage tends to be.

The broadband wavelength film produced by a prior art production method, in which the $\lambda/2$ layer and the $\lambda/4$ layer were separately produced and thereafter bonded to each other, had a thick adhesive layer. Therefore, the entirety of the broadband wavelength film was also thick. Accordingly, with a prior art broadband wavelength film, the distance between the polarizer layer and the substrate of the display panel was large. Thus, the warpage of the polarizer layer tended to become large.

On the other hand, in the broadband wavelength film produced as a co-stretched film as described above, the $\lambda/2$ layer and the $\lambda/4$ layer can be in direct contact with each other, or the thin film layer disposed between the $\lambda/2$ layer and the $\lambda/4$ layer can be thinned. Thus, since the entirety of the broadband wavelength film can be thinned, the distance between the polarizer layer and the substrate of the display panel can be decreased. This enables the suppression of the warpage of the display panel.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%" and "part" representing quantity are on the basis of weight, unless otherwise specified. The operations described below were performed under the conditions of normal temperature and normal pressure, unless otherwise specified.

[Evaluation Method]
[Method for Measuring Optical Properties of Respective Layers of Broadband Wavelength Film]

A broadband wavelength film to be evaluated was placed on a stage of a phase difference meter ("AxoScan" manufactured by Axometrics, Inc.). The change of the polarization state of polarized light passing through the broadband wavelength film before and after it passes through the broadband wavelength film was measured as the transmission polarization property of the broadband wavelength film. This measurement was performed as multi-directional measurement within the polar angle range of −55° to 55° with respect to the principal surface of the broadband wavelength film. The multi-directional measurement was performed at azimuth angle directions of 45°, 90°, 135°, and 180° with a definition that a certain azimuth angle direction on the principal surface of the broadband wavelength film is 0°. The measurement wavelength of the aforementioned measurement was 590 nm.

Subsequently, fitting calculation was performed from the transmission polarization property measured as previously described, to thereby calculate an in-plane retardation Re, a thickness direction retardation Rth, an NZ factor, and an orientation angle of each layer. In the fitting calculation, a three-dimensional refractive index and an orientation angle of each layer contained in the broadband wavelength film were set as the fitting parameters. For the fitting calculation, software ("Multi-Layer Analysis" manufactured by Axometrics, Inc.) attached to the aforementioned phase difference meter (AxoScan) was used.

[Method for Calculating Color Difference $\Delta E^*ab$ by Simulation]

Using "LCD Master" manufactured by Shintec, Inc. as simulation software, circular polarization films produced in Examples and Comparative Examples were modeled to calculate the color difference $\Delta E^*ab$ in the following setting.

As the simulation model, a structure was set up in which the circular polarization film was bonded to a planar reflective surface of an aluminum mirror in such a manner that the mirror is in contacts with the $\lambda/4$ layer side of the broadband wavelength film. Accordingly, a structure which included the linear polarization film, the $\lambda/2$ layer, the $\lambda/4$ layer, and the mirror in this order in the thickness direction was set up in this model.

In the model, the color difference $\Delta E^*ab$ when the circular polarization film was irradiated with light from a D65 light source was calculated in (i) the front direction and (ii) the tilt direction of the circular polarization film. Herein, the color difference $\Delta E^*ab$ in the tilt direction was obtained as an average of the values calculated for the color differences at a polar angle of 45° within the azimuth angle range of 0° to 360°. For the calculation of the color difference $\Delta E^*ab$, there was used, as a reference both in (i) the front direction and (ii) the tilt direction, the reflected light in the direction at a polar angle of 0° and an azimuth angle of 0° on an aluminum mirror to which the circular polarization film was not bonded. In the simulation, the surface reflection component actually generated on the surface of the circular polarization film is excluded from the calculation of the color difference $\Delta E^*ab$. A smaller value of the color difference $\Delta E^*ab$ indicates a smaller change in color tone, and is preferable.

Example 1

(First Step: Production of Layer (A))

A norbornene-based resin in a pellet shape (manufactured by ZEON Corporation; glass transition temperature 126° C.) was dried at 100° C. for 5 hours. The dried resin was supplied to an extruder, passed through a polymer pipe and a polymer filter, and was extruded from a T-die on a casting drum into a sheet shape. The extruded resin was cooled to obtain a long-length pre-stretch film having a thickness of 70 µm. The pre-stretch film thus obtained was collected by winding on a roll.

The pre-stretch film was pulled out of the roll, and continuously supplied to a tenter stretching machine. By this tenter stretching machine, the pre-stretch film was stretched in a stretching direction that forms an angle of 45° with respect to the width direction of the pre-stretch film, at a stretching temperature of 135° C. and a stretching ratio of 1.5 times. Accordingly, a long-length obliquely stretched film as the layer (A) was obtained. The obliquely stretched film thus obtained had an orientation angle of 45° and an in-plane retardation Re of 195 nm. The obliquely stretched film thus obtained was collected by winding on a roll.

(Second Step: Formation of Layer (B))

A liquid composition which contained, as a resin having a negative intrinsic birefringence, a styrene-maleic anhydride copolymer ("Daylark D332" manufactured by Nova Chemicals, glass transition temperature 130° C., oligomer ingredient containing amount 3% by weight) was prepared. This liquid composition included methyl ethyl ketone as a solvent. The concentration of the styrene-maleic anhydride copolymer in the liquid composition was 10% by weight.

The obliquely stretched film was pulled out of the roll, and coated with the aforementioned liquid composition. Thereafter, the coating of the liquid composition was dried. Thus, a layer (thickness 7 μm) of the styrene-maleic anhydride copolymer as the layer (B) was formed on the obliquely stretched film. Accordingly, a multilayer film including the obliquely stretched film as the layer (A) and the layer of the styrene-maleic anhydride copolymer as the layer (B) was obtained. The multilayer film thus obtained was collected by winding on a roll.

(Third Step: Stretching of Multilayer Film)

The multilayer film was pulled out of the roll, and continuously supplied to a longitudinal stretching machine. By this longitudinal stretching machine, the multilayer film was subjected to free uniaxial stretching in a lengthwise direction that forms an angle of 90° with respect to the width direction of the multilayer film, at a stretching temperature of 127° C. and a stretching ratio of 1.4 times. Accordingly, a broadband wavelength film was obtained as a co-stretched film including a λ/2 layer obtained by stretching the obliquely stretched film and a λ/4 layer obtained by stretching the layer of the styrene-maleic anhydride copolymer. The broadband wavelength film thus obtained was evaluated by the above-described methods.

(Production of Circular Polarization Film)

A long-length linear polarization film having an absorption axis in a lengthwise direction was prepared. This linear polarization film and the aforementioned broadband wavelength film were bonded with their lengthwise directions in parallel to each other. This bonding was performed through a tackiness agent ("CS-9621" manufactured by Nitto Denko Corporation). Accordingly, a circular polarization film which included the linear polarization film, the λ/2 layer, and the λ/4 layer in this order was obtained. The circular polarization film thus obtained was evaluated by the above-described methods.

Example 2

A long-length broadband wavelength film and a circular polarization film were produced and evaluated by the same operation as that in Example 1 except that the method for forming the layer (B) in the second step was changed to the following extrusion method.

(Second Step: Formation of Layer (B) by Extrusion Method)

As a resin having a negative intrinsic birefringence, the same styrene-maleic anhydride copolymer as the one used in Example 1 was prepared. To this styrene-maleic anhydride copolymer, triphenyl phosphate as a plasticizer was added in an amount of 10% by weight relative to 100% by weight of a styrene-maleic acid copolymer to adjust the glass transition temperature. As a result of this adjustment of the glass transition temperature, a λ/4 layer having the same optical properties as those in Example 1 can be obtained by a third step having the same conditions as those in Example 1, even when the layer (B) is thicker than that in Example 1. The resin containing the styrene-maleic anhydride copolymer and triphenyl phosphate obtained in this manner was charged in an extruder equipped with a die as a resin extrusion die.

The obliquely stretched film was pulled out of the roll. The aforementioned resin was extruded onto the obliquely stretched film in a molten state at an extrusion temperature of 260° C. into a film shape. Cooling was performed while the extruded resin was in a state of being attached to the obliquely stretched film, to thereby cure the resin. Thus, a layer (thickness 20 μm) of the resin containing the styrene-maleic anhydride copolymer as the layer (B) was formed.

Example 3

A long-length broadband wavelength film and a circular polarization film were produced and evaluated by the same operation as that in Example 1 except that the method for forming the layer (B) in the second step was changed to the following bonding method.

(Second Step: Formation of Layer (B) by Bonding Method)

A liquid composition containing a styrene-maleic anhydride copolymer was prepared as a resin having a negative intrinsic birefringence which is the same as the one used in Example 1. The pre-stretch film produced in the first step of Example 1 was pulled out of the roll, and coated with the liquid composition. Thereafter, the coating of the liquid composition was dried. Thus, a layer (thickness 7 μm) of the styrene-maleic anhydride copolymer as the layer (B) was formed on the pre-stretch film.

The obliquely stretched film was pulled out of the roll. One surface of the obliquely stretched film was bonded to a tackiness layer ("CS-9621T" manufactured by Nitto Denko Corporation). Furthermore, the aforementioned layer of the styrene-maleic anhydride copolymer formed on the pre-stretch film was bonded to the obliquely stretched film through the tackiness layer. Thereafter, the pre-stretch film was peeled off. Thus, the layer of the styrene-maleic anhydride copolymer as the layer (B) was formed on the obliquely stretched film through the tackiness layer. Consequently, a multilayer film which included the obliquely stretched film, the tackiness layer, and the layer of the styrene-maleic anhydride copolymer in this order was obtained.

Comparative Example 1

A long-length broadband wavelength film and a circular polarization film were produced and evaluated by the same operation as that in Example 1 except that a pre-stretch film was used as the layer (A) instead of the obliquely stretched film, that the stretching temperature in the third step was changed, and that the glass transition temperature of the resin having a negative intrinsic birefringence was adjusted to obtain a λ/4 layer having the same in-plane retardation as that in Example 1. Specifically, the following operations were performed.

To a styrene-maleic anhydride copolymer which was the same as the one used in Example 1, triphenyl phosphate as a plasticizer was added in an amount of 5% by weight relative to 100% by weight of a styrene-maleic acid copolymer to adjust the glass transition temperature. The resin containing the styrene-maleic anhydride copolymer and triphenyl phosphate obtained in this manner was mixed with methyl ethyl ketone as a solvent to prepare a liquid composition having a solid content concentration of 10% by weight. The pre-stretch film produced in the first step of Example 1 was pulled out of the roll, and coated with the liquid composition. Thereafter, the coating of the liquid composition was dried. Thus, a layer (thickness 7 μm) of a resin containing the styrene-maleic anhydride copolymer was formed on the pre-stretch film. Accordingly, a multilayer film which included the pre-stretch film and the layer of the resin containing the styrene-maleic anhydride copolymer was obtained. The multilayer film thus obtained was collected by winding on a roll.

The multilayer film was pulled out of the roll, and continuously supplied to a longitudinal stretching machine. The multilayer film was subjected to free uniaxial stretching in a lengthwise direction that forms an angle of 90° with respect to the width direction of the multilayer film, at a stretching temperature of 128° C. and a stretching ratio which was the same as that in the third step of Example 1 by this longitudinal stretching machine. Thus, a long-length broadband wavelength film was obtained. The broadband wavelength film thus obtained was evaluated by the above-described methods.

The broadband wavelength film obtained in this manner was bonded to a linear polarization film in the same manner as in Example 1 to produce a circular polarization film. The circular polarization film thus obtained was evaluated by the above-described methods. However, the relationship between the absorption axis and the slow axis of this circular polarization film was outside the range for functioning as a circular polarization film. Thus, a sufficient reflection suppressing effect could not be obtained. As a result, a color difference ΔE*ab which is significant to a degree that allows the evaluation of the function of suppressing coloring was not obtained.

Comparative Example 2

A long-length broadband wavelength film was produced and evaluated by the same operation as that in Example 1 except that a pre-stretch film was used instead of the obliquely stretched film as the layer (A), and that the stretching direction and the stretching ratio in the third step were changed. Specifically, the following operations were performed.

A liquid composition containing a styrene-maleic anhydride copolymer as the resin having a negative intrinsic birefringence that is the same as the one used in Example 1 was prepared. The pre-stretch film produced in the first step of Example 1 was pulled out of the roll, and coated with the aforementioned liquid composition. Thereafter, the coating of the liquid composition was dried. Thus, a layer (thickness 7 μm) of the styrene-maleic anhydride copolymer was formed on the pre-stretch film. Accordingly, a multilayer film including the pre-stretch film and the layer of the styrene-maleic anhydride copolymer. The multilayered film thus obtained was collected by winding on a roll.

This multilayer film was pulled out of the roll and continuously supplied to a tenter stretching machine. By this tenter stretching machine, the multilayer film was stretched in a stretching direction that forms an angle of 45° with respect to the width direction of the multilayer film, at a stretching ratio of 1.5 times and at the same stretching temperature as that in the third step of Example 1 to obtain a long-length broadband wavelength film. The broadband wavelength film thus obtained was evaluated by the above-described methods.

The broadband wavelength film thus obtained was bonded to a linear polarization film in the same manner as in Example 1 to produce a circular polarization film. The circular polarization film thus obtained was evaluated by the above-described methods.

[Results]

The results of Examples 1 to 3 and Comparative Examples 1 and 2 described above are shown in the following Table 1. In the Table 1, the meanings of abbreviations are as follows.

COP: norbornene polymer
ST: styrene-maleic anhydride polymer
Re: in-plane retardation
Rth: retardation in the thickness direction
Orientation angle: angle formed by the slow axis with respect to the width direction
Total thickness: total thickness of λ/2 layer and λ/4 layer. In Example 3, the thickness of the tackiness agent layer is not included in the total thickness.
Oblique: oblique direction.
Longitudinal: lengthwise direction.

TABLE 1

[Results of Examples 1-3 and Comparative Examples 1-2]

| | Ex. 1 | | Ex. 2 | | Ex. 3 | | Comp. Ex. 1 | | Comp. Ex. 2 | |
|---|---|---|---|---|---|---|---|---|---|---|
| | Layer (A) | Layer (B) | Layer (A) | Layer (B) | Layer (A) | Layer (B) | Layer (A) | Layer (B) | Layer (A) | Layer (B) |
| First step | | | | | | | | | | |
| Material | COP | — | COP | — | COP | — | COP | — | COP | — |
| Stretching direction | Oblique | — | Oblique | — | Oblique | — | Unstretched | — | Unstretched | — |
| Stretching ratio (times) | 1.5 | — | 1.5 | — | 1.5 | — | 0 | — | 0 | — |
| Re (nm) | 195 | — | 195 | — | 195 | — | 5 | — | 5 | — |
| Orientation angle (°) | 45 | — | 45 | — | 45 | — | 0 | — | 0 | — |
| NZ factor | 1.10 | — | 1.10 | — | 1.10 | — | — | — | — | — |
| Thickness (μm) | 47 | — | 47 | — | 47 | — | 70 | — | 70 | — |
| Second step | | | | | | | | | | |
| Material | — | ST | — | ST | — | ST | — | ST | — | ST |
| Forming method | — | Coating | — | Extrusion | — | Bonding | — | Coating | — | Coating |
| Thickness (μm) | — | 7 | — | 20 | — | 7 | — | 7 | — | 7 |

TABLE 1-continued

[Results of Examples 1-3 and Comparative Examples 1-2]

|  | Ex. 1 | | Ex. 2 | | Ex. 3 | | Comp. Ex. 1 | | Comp. Ex. 2 | |
| --- | --- | --- | --- | --- | --- | --- | --- | --- | --- | --- |
|  | Layer (A) | Layer (B) | Layer (A) | Layer (B) | Layer (A) | Layer (B) | Layer (A) | Layer (B) | Layer (A) | Layer (B) |
| Third step |  |  |  |  |  |  |  |  |  |  |
| Stretching direction | Longitudinal | | Longitudinal | | Longitudinal | | Longitudinal | | Oblique | |
| Stretching ratio (times) | 1.4 | | 1.4 | | 1.4 | | 1.4 | | 1.5 | |
| Re (nm) | 260 | 125 | 260 | 125 | 260 | 125 | 260 | 125 | 260 | 125 |
| Rth (nm) | 176.8 | −87.5 | 176.8 | −87.5 | 176.8 | −62.5 | 130 | −62.5 | 156 | −87.5 |
| Orientation angle (°) | 67.5 | 0 | 67.5 | 0 | 67.5 | 0 | 90 | 0 | 45 | 135 |
| NZ factor | 1.18 | −0.20 | 1.18 | −0.20 | 1.18 | 0.00 | 1.00 | 0 | 1.10 | −0.2 |
| Thickness (μm) | 40 | 6 | 40 | 17 | 40 | 6 | 50 | 5 | 47 | 5 |
| Total thickness (μm) | 46 | | 57 | | 71 | | 75 | | 51 | |
| Front direction ΔE*ab | 3.7 | | 3.7 | | 3.7 | | Unmeasurable | | 20.5 | |
| Tilt direction ΔE*ab | 17.7 | | 17.7 | | 16.7 | | Unmeasurable | | 23.5 | |

Example 4

(First Step: Production of Layer (A))

A norbornene-based resin in a pellet shape (manufactured by ZEON Corporation; glass transition temperature 126° C.) was dried at 100° C. for 5 hours. The dried resin was supplied to an extruder, passed through a polymer pipe and a polymer filter, and was extruded from a T-die onto a casting drum into a sheet shape. The extruded resin was cooled to obtain a long-length pre-stretch film having a thickness of 70 μm. The pre-stretch film thus obtained was collected by winding on a roll.

The pre-stretch film was pulled out of the roll, and continuously supplied to a tenter stretching machine. By this tenter stretching machine, the pre-stretch film was stretched in a stretching direction that forms an angle of 45° with respect to the width direction of the pre-stretch film at a stretching temperature of 135° C. and a stretching ratio of 1.5 times. Accordingly, a long-length obliquely stretched film as the layer (A) was obtained. The obliquely stretched film thus obtained had an orientation angle of 45° and an in-plane retardation Re of 215 nm. The obliquely stretched film thus obtained was collected by winding on a roll.

(Fourth Step: Formation of Thin Film Layer)

An acryl polymer ("DA105" manufactured by Arakawa Chemical Industries, Ltd.) and an isocyanate-based cross-linking agent ("CL series" manufactured by Arakawa Chemical Industries, Ltd.) for cross-linking the acryl polymer were mixed with a weight ratio of 10:3. The mixture was diluted with methyl isobutyl ketone into a solid content concentration of 20%. Thus, a solution for forming a thin film layer was obtained.

The obliquely stretched film was pulled out of the roll. One surface thereof was subjected to a corona treatment. The corona treatment was performed under the conditions of a line speed of 10 m/min, nitrogen atmosphere, and an output of 1.5 kW. Thereafter, the corona treated surface was coated with the solution for forming a thin film layer using a reverse gravure coater which rotates reversely to the film conveyance direction. Subsequently, the coating of the solution was dried at 100° C. During the drying, the cross-linking of the acryl polymer in the solution proceeded. Accordingly, a thin film layer containing the cross-linked acryl polymer was formed.

(Second Step: Formation of Layer (B))

As a resin having a negative intrinsic birefringence, a styrene-maleic anhydride copolymer ("Daylark D 332" manufactured by Nova Chemicals) was prepared. A mixed solvent containing methyl ethyl ketone and methyl isobutyl ketone in a weight ratio of 8:2 was also prepared. 100 parts of the styrene-maleic anhydride copolymer were dissolved in the mixed solvent, and 5 parts of triphenyl phosphate as a plasticizer was added to obtain a liquid composition having a solid content concentration of 12.5% by weight.

With this liquid composition, the aforementioned thin film layer was coated by die coating. The coating of the liquid composition was dried at 120° C. to form a layer (B) having a thickness of 10 μm. Accordingly, a multilayer film including the obliquely stretched film as the layer (A), the thin film layer containing the crosslinked acrylic polymer, and a resin layer containing the styrene-maleic anhydride copolymer as the layer (B) was obtained. The multilayer film thus obtained was collected by winding on a roll.

(Third Step: Stretching of Multilayer Film)

The multilayer film was pulled out of the roll, and continuously supplied to a longitudinal stretching machine. By this longitudinal stretching machine, the multilayer film was subjected to free uniaxial stretching in a lengthwise direction that forms an angle of 90° with respect to the width direction of the multilayer film, at a stretching temperature of 127° C. and a stretching ratio of 1.42 times. Thereby, a broadband wavelength film was obtained as a co-stretched film including a λ/2 layer obtained by stretching the obliquely stretched film, the thin film layer (thickness: 0.8 μm), a λ/4 layer obtained by stretching the resin layer containing the styrene-maleic anhydride copolymer, in this order. The broadband wavelength film thus obtained was evaluated by the above-described methods.

Furthermore, this long-length broadband wavelength film was subjected to evaluation of warpage by the following evaluation method.

A linear polarization film which included a polarizer layer (formed of polyvinyl alcohol; thickness 23 μm) and a protective film layer (formed of triacetyl cellulose; thickness 40 μm) disposed to one surface of the polarizer layer was prepared. The surface on the polarizer layer side of this linear polarization film and the surface on the λ/2 layer side of the broadband wavelength film were bonded through an adhesive layer ("KRX-7007" manufactured by Adeka Corporation; thickness 2 μm) to obtain a sample film. The broadband wavelength film side of this sample film was bonded to a rectangular glass plate (length 170 mm, width 100 mm, thickness 0.5 mm) through a tackiness agent ("CS-9621T" manufactured by Nitto Denko Corporation; thickness 25 μm). The area of the sample film which ran off the glass plate was removed. Thus, a sample plate for evaluating warpage was obtained.

This sample plate was placed in an oven at 85° C. for 24 hours.

Thereafter, the sample plate was removed from the oven, and placed on a horizontal plane in such a manner that the sample film was positioned on the upper side in the gravity direction. Then, the heights from the plane to the four corners of the glass plate were measured. An average value of the measured heights was calculated as a warpage amount.

(Production of Circular Polarization Film)

A circular polarization film was produced and evaluated by the same method as that in Example 1 using the obtained broadband wavelength film.

Comparative Example 3

(Production of Film Corresponding to λ/2 Layer)

The obliquely stretched film produced in the first step of Example 1 was pulled out of the roll, and continuously supplied to a longitudinal stretching machine. The obliquely stretched film was subjected to free uniaxial stretching in a lengthwise direction that forms an angle of 90° with respect to the width direction of the obliquely stretched film, at a stretching temperature of 127° C. and a stretching ratio of 1.42 times by this longitudinal stretching machine. Accordingly, a long-length biaxially stretched film having an in-plane retardation Re of 270 nm, an orientation angle of 75°, and a thickness of 40 μm was obtained.

(Production of Film Corresponding to λ/4 Layer)

A norbornene-based resin in a pellet shape (manufactured by ZEON Corporation; glass transition temperature 126° C.) was dried at 100° C. for 5 hours. The dried resin was supplied to an extruder, passed through a polymer pipe and a polymer filter, and was extruded from a T-die onto a casting drum in a sheet shape. The extruded resin was cooled to obtain a long-length pre-stretch film having a thickness of 115 μm. The pre-stretch film thus obtained was collected by winding on a roll.

The pre-stretch film was pulled out of the roll, and continuously supplied to a tenter stretching machine. By this tenter stretching machine, the pre-stretch film was stretched in a stretching direction that forms an angle of 15° with respect to the width direction of the pre-stretch film at a stretching temperature of 135° C. and a stretching ratio of 5.0 times. Accordingly, a long-length obliquely stretched film was obtained. The obliquely stretched film thus obtained had an orientation angle of 15°, an in-plane retardation Re of 140 nm, and a thickness of 22 μm.

(Production of Circular Polarization Film)

A linear polarization film which included a polarizer layer (formed of polyvinyl alcohol; thickness 23 μm) and a protective film layer (formed of triacetyl cellulose; thickness 40 μm) disposed on one surface of the polarizer layer was prepared. The surface on the polarizer layer side of this linear polarization film and the aforementioned biaxially stretched film were bonded through an adhesive layer ("KRX-7007" manufactured by Adeka Corporation; thickness 2 μm).

The surface of the biaxially stretched film bonded to the linear polarization film was subjected to a corona treatment. Also, one surface of the aforementioned obliquely stretched film was subjected to a corona treatment. The corona treated surface of the biaxially stretched film and the corona treated surface of the obliquely stretched film were bonded through a tackiness layer ("CS-9621T" manufactured by Nitto Denko Corporation; thickness 25 μm). This bonding was performed with the lengthwise direction of the biaxially stretched film and the lengthwise direction of the obliquely stretched film aligned in parallel, such that the angle formed between the slow axis of the biaxially stretched film and the slow axis of the obliquely stretched film became 60°. Accordingly, a long-length circular polarization film which included the linear polarization film, the adhesive layer, the λ/2 layer as the biaxially stretched film, the tackiness layer, and the λ/4 layer as the obliquely stretched film, in this order was obtained. This circular polarization film was evaluated by the above-described methods. Also, this circular polarization film was used in place of the sample film to evaluate warpage by the same evaluation method as in Example 4.

[Results]

The results of Example 4 and Comparative Example 3 described above are shown in the following Table 2. In the Table 2, the meanings of the abbreviations are the same as in the Table 1.

TABLE 2

[Results of Example 4 and Comparative Example 3]

|  | Ex. 4 | | Comp. Ex. 3 | |
| --- | --- | --- | --- | --- |
|  | Layer (A) | Layer (B) | Layer (A) | Layer (B) |
| First step | | | | |
| Material | COP | — | COP | COP |
| Stretching direction | Oblique | — | Oblique | Oblique |
| Stretching ratio (times) | 1.5 | — | 1.5 | 5.0 |
| Re (nm) | 215 | — | 195 | — |
| Orientation angle (°) | 45 | — | 45 | — |
| NZ factor | 1.08 | — | 1.10 | — |
| Thickness (μm) | 47 | — | 47 | — |
| Second step | | | | |
| Material | — | ST | — | — |
| Forming method | — | Coating | — | — |
| Thickness (μm) | — | 10 | — | — |
| Third step | | | | |
| Stretching direction | Longitudinal | | Longitudinal | — |
| Stretching ratio (times) | 1.42 | | 1.42 | — |
| Re (nm) | 260 | 125 | 270 | 140 |
| Rth (nm) | 177 | −87 | 182 | 91 |
| Orientation angle (°) | 70 | 5 | 75 | 15 |
| NZ factor | 1.18 | −0.20 | 1.17 | 1.15 |
| Thickness (μm) | 40 | 7 | 40 | 22 |
| Total thickness (μm) | 47.8 | | 87 | |
| Front direction ΔE*ab | 3.7 | | 2.5 | |
| Tilt direction ΔE*ab | 17.7 | | 25.5 | |
| Warpage (mm) | 2.7 | | 5.3 | |

REFERENCE SIGN LIST 100 layer (A)
200 multilayer film
210 layer (B)
300 broadband wavelength film

The invention claimed is:

1. A method for producing a broadband wavelength film comprising, in this order:
   a first step of preparing a layer (A) as a long-length obliquely stretched film;
   a second step of forming on the layer (A) a layer (B) of a resin having a negative intrinsic birefringence to obtain a multilayer film; and
   a third step of stretching the multilayer film to obtain a long-length broadband wavelength film including a λ/2 layer and a λ/4 layer, wherein
   the layer (A) has a slow axis that form an angle of greater than 15° and smaller than 50° with respect to a width direction of the layer (A).

2. The method for producing a broadband wavelength film according to claim 1, wherein the λ/2 layer has a slow axis that forms an angle of 67.5°±10° with respect to a width direction of the broadband wavelength film.

3. The method for producing a broadband wavelength film according to claim 1, wherein the λ/4 layer has a slow axis that forms an angle of 0°±20° with respect to a width direction of the broadband wavelength film.

4. The method for producing a broadband wavelength film according to claim 1, wherein the second step includes coating the layer (A) with a composition containing the resin having a negative intrinsic birefringence.

5. The method for producing a broadband wavelength film according to claim 1, wherein the second step includes extruding on the layer (A) the resin having a negative intrinsic birefringence.

6. The method for producing a broadband wavelength film according to claim 1, wherein the second step includes bonding to the layer (A) a film of the resin having a negative intrinsic birefringence.

7. The method for producing a broadband wavelength film according to claim 1, wherein the third step includes stretching the multilayer film in a stretching direction that forms an angle of 90°±20° with respect to a width direction of the multilayer film.

8. The method for producing a broadband wavelength film according to claim 1, wherein the λ/2 layer is a layer obtained by stretching the layer (A).

9. The method for producing a broadband wavelength film according to claim 1, wherein the λ/4 layer is a layer obtained by stretching the layer (B).

10. A method for producing a circular polarization film comprising:
    a step of producing a broadband wavelength film by the production method according to claim 1; and
    a step of bonding the broadband wavelength film and a long-length linear polarization film.

11. The method for producing a circular polarization film according to claim 10, wherein the linear polarization film has an absorption axis in a lengthwise direction of the linear polarization film.

* * * * *